(12) United States Patent
Martin Leung et al.

(10) Patent No.: US 12,036,994 B2
(45) Date of Patent: Jul. 16, 2024

(54) OPERATIONAL DESIGN DOMAIN DETECTION FOR ADVANCED DRIVER ASSISTANCE SYSTEMS

(71) Applicant: Stoneridge Electronics, A.B., Solna (SE)

(72) Inventors: Barbara Martin Leung, Solna (SE); Milan Gavrilovic, Uppsala (SE); Anisse Taleb, Kista (SE)

(73) Assignee: STONERIDGE ELECTRONICS A.B., Solna (SE)

( * ) Notice: Subject to any disclaimer, the term of this patent is extended or adjusted under 35 U.S.C. 154(b) by 307 days.

(21) Appl. No.: 17/365,262

(22) Filed: Jul. 1, 2021

(65) Prior Publication Data

US 2022/0009500 A1 Jan. 13, 2022

Related U.S. Application Data

(60) Provisional application No. 63/048,673, filed on Jul. 7, 2020.

(51) Int. Cl.
*B60W 40/00* (2006.01)
*B60W 40/02* (2006.01)
(Continued)

(52) U.S. Cl.
CPC ............. *B60W 40/02* (2013.01); *G06T 5/50* (2013.01); *G06T 7/70* (2017.01); *G06V 20/56* (2022.01);
(Continued)

(58) Field of Classification Search
CPC ............. B60W 40/02; B60W 2555/20; B60W 2420/42; G06T 7/70; G06T 5/50;
(Continued)

(56) References Cited

U.S. PATENT DOCUMENTS 6,772,062 B2 8/2004 Lasky et al.
10,091,465 B2 10/2018 Dellantoni et al.
(Continued)

FOREIGN PATENT DOCUMENTS

DE 102019003562 1/2020
EP 3010761 B1 7/2019

OTHER PUBLICATIONS

Jose Fumo, "Types of Machine Learning Algorithms You Should Know," Jun. 15, 2017, Towards Data Science, whole document. (Year: 2017).*

(Continued)

*Primary Examiner* — Tiffany P Young
(74) *Attorney, Agent, or Firm* — Carlson, Gaskey & Olds, P.C.

(57) ABSTRACT

A vehicle controller including a driver assistance module configured to perform at least one of an automated and a semi-automated driver assistance function. The at least one of the automated and the semi-automated driver assistance function including a rated operational domain. The vehicle controller also including an image based operational domain detector including at least one channel configured to receive an image from a frame buffer and determine at least part of an operational domain of at least one camera originating the image based at least in part on the image.

19 Claims, 3 Drawing Sheets

(51) Int. Cl.
    *G06T 5/50*    (2006.01)
    *G06T 7/70*    (2017.01)
    *G06V 20/56*   (2022.01)

(52) U.S. Cl.
    CPC ... *B60W 2420/403* (2013.01); *B60W 2555/20* (2020.02); *G06T 2207/20084* (2013.01); *G06T 2207/30252* (2013.01); *G06V 2201/07* (2022.01)

(58) Field of Classification Search
    CPC .......... G06T 2207/20084; G06T 2207/30252; G06V 20/56; G06V 2201/07
    USPC .......................................................... 701/28
    See application file for complete search history.

(56) References Cited

U.S. PATENT DOCUMENTS

2020/0409362 A1* 12/2020 Long .................... B60W 50/14
2021/0094576 A1*  4/2021 Hayes ............... B60W 60/0015

OTHER PUBLICATIONS

International Preliminary Report on Patentability for International Patent Application No. PCT/EP2021/068835 issued on Jan. 10, 2023.
International Search Report and Written Opinion for International Patent Application No. PCT/EP2021/068835 completed on Oct. 1, 2021.

* cited by examiner

OPERATIONAL DESIGN DOMAIN DETECTION FOR ADVANCED DRIVER ASSISTANCE SYSTEMS

CROSS-REFERENCE TO RELATED APPLICATION

This application claims priority to U.S. Provisional Patent Application No. 63/048,673 filed on Jul. 7, 2020.

TECHNICAL FIELD

The present disclosure relates generally to driver assistance systems, and more specifically to an image based operational domain detection system for the same.

BACKGROUND

Commercial vehicles including tractor trailers, cargo transportation vans as well as other vehicle systems including construction equipment and industrial vehicles, often include driver assistance features. Similar systems are incorporated in passenger vehicles and other privately owned vehicles and provide similar functions. The driver assistance features include systems that operate the vehicle either fully or partially autonomously, thereby assisting the vehicle operator in performing vehicle operations that may be difficult or hazardous. Typical commercial or industrial vehicles also include other automated or semi-automated vehicle systems that may assist an operator or assist in other vehicle functions outside the scope of driver assistance systems.

Each driver assistance system, or function within a driver assistance system, is rated for operation in a given range of conditions. Similarly, other automated or semi-automated vehicle systems are designed to operate within a given range of conditions and may be inaccurate outside of that range. The range of conditions is referred to as the operational design domain of the system and can be applied to automated driver assistance systems, or to a broader classification of any automated or semi-automated vehicle system. By way of example, a vehicle system can be rated to operate in dry conditions (precipitation below a threshold) and within a predefined temperature range. By providing an operational design domain for the system, vehicle designers ensure that the vehicle system is able to properly operate, or assist in operating, the vehicle and ensure that the system is not operated in unsuitable conditions.

SUMMARY OF THE INVENTION

In one exemplary embodiment a vehicle controller includes a driver assistance module configured to perform at least one of an automated and a semi-automated driver assistance function, the at least one of the automated and the semi-automated driver assistance function including a rated operational domain, and an image based operational domain detector including at least one channel configured to receive an image from a frame buffer and determine at least part of an operational domain of at least one camera originating the image based at least in part on the image.

In another example of the above described vehicle controller the operational domain of the at least one camera corresponds to an operational domain of a vehicle to which the at least one camera is mounted.

In another example of any of the above described vehicle controllers the at least one channel comprises a plurality of channels.

In another example of any of the above described vehicle controllers each channel in the plurality of channels is configured to utilize the image to detect a distinct part of the operational domain of the at least one camera.

In another example of any of the above described vehicle controllers at least one of the channels in the plurality of channels includes a module configured to analyze the image using a neural network analysis.

In another example of any of the above described vehicle controllers at least one of the channels in the plurality of channels includes a module configured to analyze the image using a rules based analysis.

In another example of any of the above described vehicle controllers at least one of the channels in the plurality of channels includes an input configured to receive at least one sensor signal.

In another example of any of the above described vehicle controllers the at least one sensor signal includes at least one of a geographic positioning system signal, a speed signal, an acceleration signal, and an inertial data signal.

Another example of any of the above described vehicle controllers further includes a compilation module configured to compile an output of each channel in the plurality of channels into a single operational domain output.

In another example of any of the above described vehicle controllers the at least one channel includes at least one of an occlusion detection channel, a weather detection channel, and a speed detection channel.

Another example of any of the above described vehicle controllers further includes a comparison module configured to compare an operational domain detected by the image based operational domain detector and the rated operation domain.

An exemplary method for operating a vehicle driver assist system includes receiving at least one image from at least one vehicle camera, determining an operational domain of a vehicle by analyzing the at least one image, and comparing the determined operational domain with a rated operational domain of a currently operating function of the vehicle driver assist system.

Another example of the above described method for operating a vehicle driver assistance system further includes preventing the currently operating function of the vehicle driver assist system from operating in response to the determined operational domain being outside of the rated operational domain.

In another example of any of the above described methods for operating a vehicle driver assistance system determining the operational domain of the vehicle includes analyzing the at least one image using at least one neural network.

In another example of any of the above described methods for operating a vehicle driver assistance system determining the operational domain of the vehicle includes analyzing the at least one image using at least one rules based analysis.

In another example of any of the above described methods for operating a vehicle driver assistance system determining the operational domain of the vehicle by analyzing the at least one image further comprises verifying at least one component of the determine operational domain using at least one vehicle sensor.

In another example of any of the above described methods for operating a vehicle driver assistance system the at least one vehicle sensor includes at least one of a geographic positioning system signal, a speed signal, an acceleration signal, and an inertial data signal.

These and other features of the present invention can be best understood from the following specification and drawings, the following of which is a brief description.

DETAILED DESCRIPTION

Figure 1:
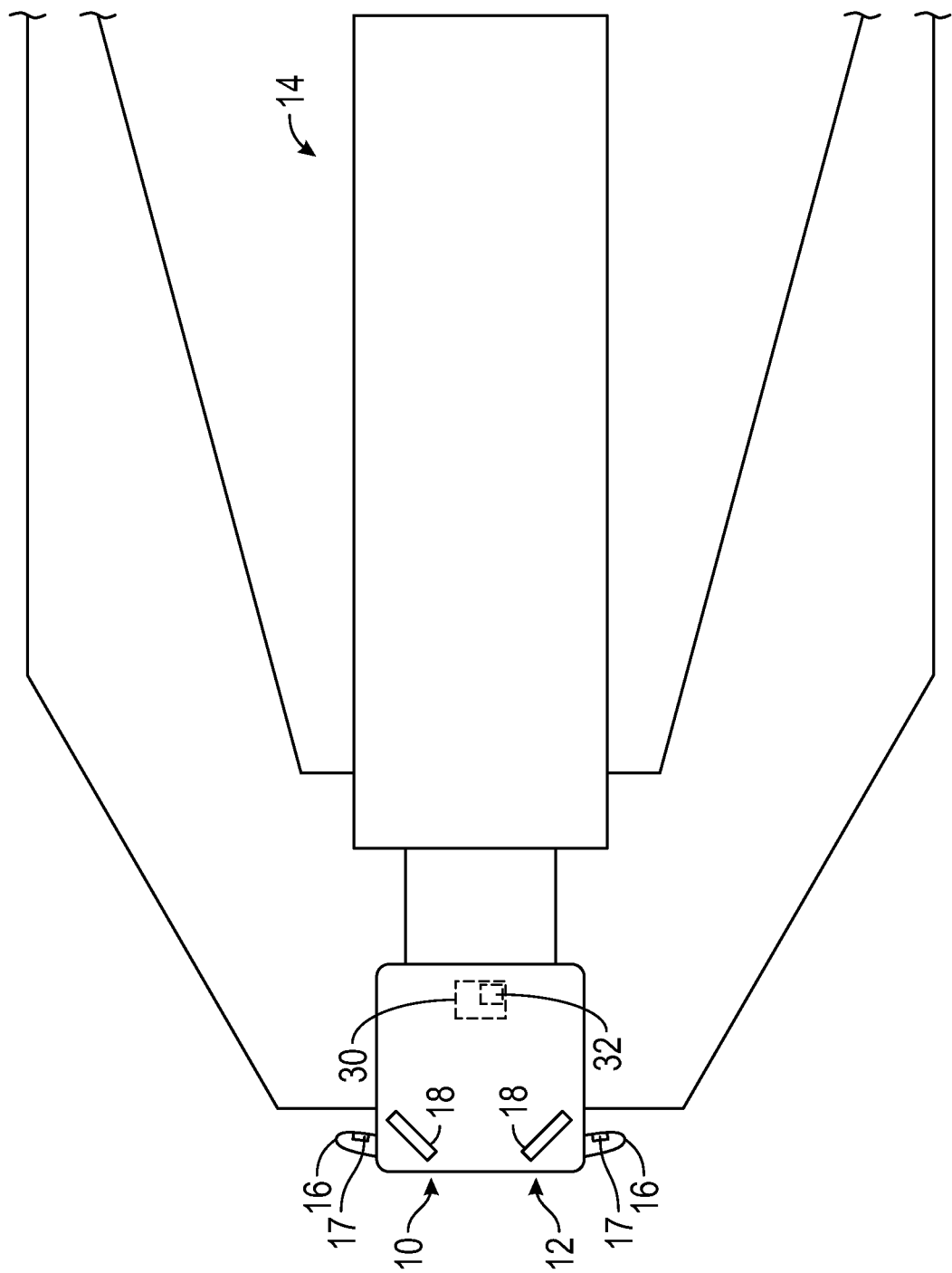
FIG. 1 illustrates an exemplary commercial vehicle including a driver assistance system.

A schematic view of a commercial truck 10 is illustrated in FIG. 1. The truck 10 includes a vehicle cab 12 pulling a trailer 14. Driver and passenger side camera housings 16 are mounted to the vehicle cab 12. If desired, the camera housings 16 may include conventional mirrors integrated with them as well. In some examples, cameras 17 contained within the camera housings 16 are incorporated into a mirror replacement system, where rear images of the vehicle 10 are generated using the cameras 17 and provided to the vehicle operator. First and second displays 18 are arranged on each of the driver and passenger sides within the vehicle cab 12 to display on each side of the vehicle 10 generated by the cameras 17. Fewer or more displays may be used than shown, and the displays may be located differently than illustrated.

Included within the vehicle 10 is a controller 30. The controller 30 is configured to receive the video feeds from each of the cameras 17. In some examples, the video feeds can be combined into a single image. In other examples, each video feed can be provided to the controller 30 independently and either combined by the controller 30 or used independently, depending on the systems in by the controller 30 that utilize video feeds.

The exemplary controller 30 includes an advanced driver assistance system (ADAS) 32. In alternative examples, the controller 30 can include an automated driving system (ADS) in addition to, or in place of, the ADAS 32. Further, while described below with regards to the exemplary context of driver assistance systems, it should be appreciated that the operational design domain monitor can be applied to a broader category of automated or semi-automated vehicle systems beyond that of only ADAS and ADS systems. The driver assistance systems can be configured according to any known driver assistance system and can perform any number of known driving functions. Traditional ADAS 32 modules rely on information feeds from multiple dedicated sensors disposed throughout or around the vehicle 10 to ensure that the system is operating within the correct operational domain, and to provide the required information to make automated or semi-automated decisions. These sensors can include illumination sensors, humidity sensors, cameras, radar and the like. The inclusion of dedicated operational domain sensors increase the cost and complexity of the driver assistance system.

Figure 2:
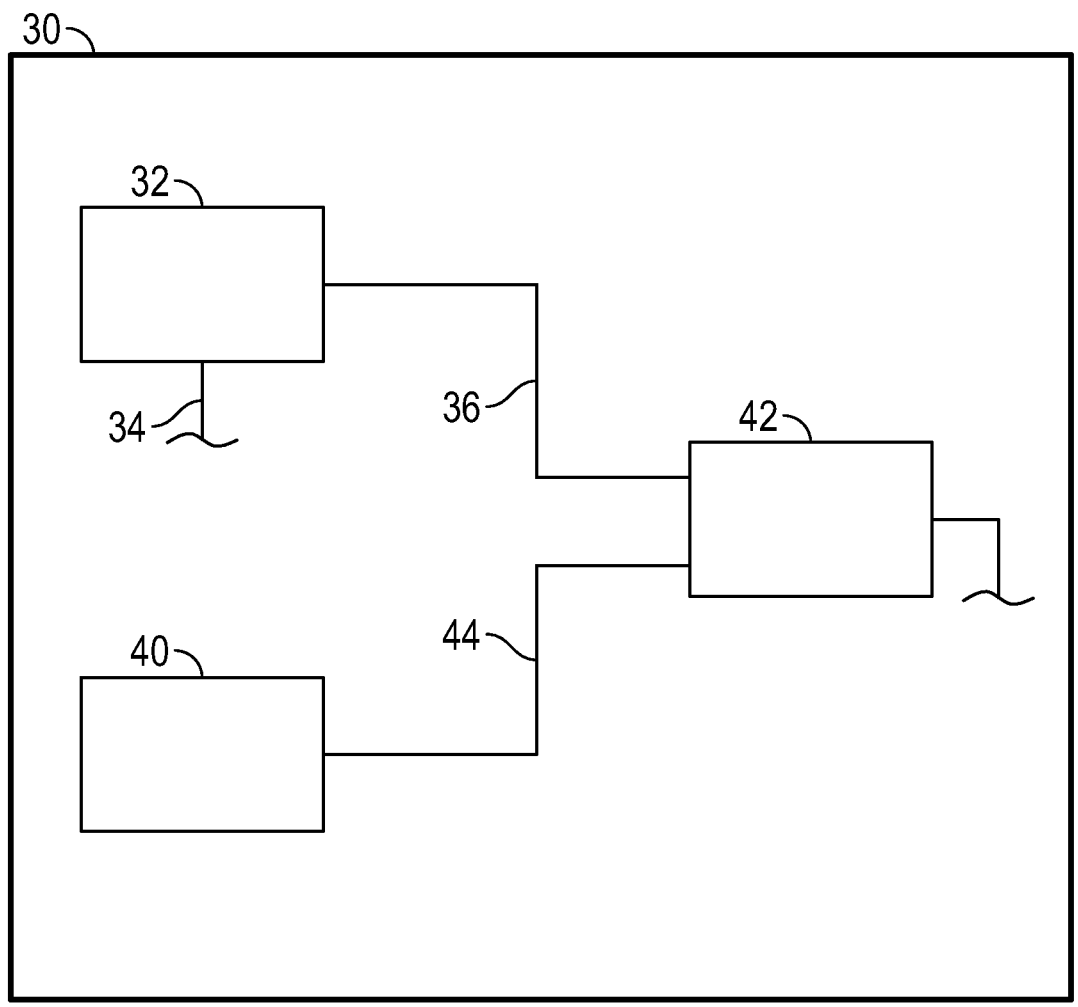
FIG. 2 illustrates a controller including an operational domain monitor configured to monitor operating conditions of the vehicle using image feeds from the vehicle.

Included within, or connected to, each of the ADAS 32, or the ADS in controllers 30 including an ADS, is a system for monitoring the external conditions of the vehicle 10 and determining the operational domain of the vehicle 10. The system is referred to as an operational domain monitor (ODM). Also included is comparison module that ensures that the rated operational domain of a currently operating driver assistance feature matches the current operational domain detected by the ODM. With continued reference to FIG. 1, FIG. 2 illustrates a controller 30 including an ADAS 32, an ODM 40, and a comparison module 42 which function cooperatively to ensure that the vehicle is operating within the current operational design domain of an ADAS function. The ODM 40 provides an output 44 corresponding to the detected current operational domain of the vehicle 10.

The ODM output 44 is provided to the comparison module 42, which compares the detected operational domain of the vehicle from the ODM 40 to the rated operational domain (the operational design domain) of the current ADAS 32 function. The rated operational domain of the ADAS 32 function is output from the ADAS 32 via an output 36 and describes the operational design domain in which the current function of the ADAS 32 is rated to operate safely. The rated operational design domain of the ADAS includes roadway type, geographic area (e.g. city, mountain, dessert, etc.) speed range of the vehicle, environmental conditions such as daytime, weather conditions, as well as any other operational roadway constraints that may depend on the specific ADAS function being operated.

The output 44 is used by the comparison module 42 to decide whether the ADAS output 34 (the operational design domain) is the same as the detected operating conditions of the vehicle 10. If the ADAS 32 is operating outside of its domain (e.g. the operational design domain of the ADAS 32 does not match the operating conditions of the vehicle 10), the comparison module 42 informs the controller 30 of the mismatch. When a mismatch is detected, the controller 30 prevents the ADAS 32 from operating and control of the vehicle 10 is returned to the operator. In alternative examples, the controller 30 can be configured to force a "worst possible response" of the ADAS in light of an operational domain mismatch when the currently operating ADAS function is a safety related function. The "worst possible response" is a response to the worst possible condition, and does not necessarily reflect the worst possible outcome of no response.

It is appreciated that the utilization of additional dedicated sensor systems by the ODM 40 to determine the operational domain of the vehicle increases the costs and mechanical complexity of a vehicle relying on dedicated sensors. In order to reduce the costs and mechanical complexity, the vehicle 10 utilizes an image based ODM 40. The image based ODM 40 receives an image, or a sequence of images, from the cameras 17 and analyzes the image itself to determine the current operational domain of the vehicle 10. In some examples, the ODM 40 can be a distinct hardware module that can be connected to the vehicle 10 and communicate with a controller 30. In alternative examples, the ODM 40 can be integrated into the controller 30 as a distinct hardware section of the controller 30.

Advantageously, the image feeds can be sourced from other vehicle systems already generating images, thereby reducing the parts and complexity of the system. By way of example, the images can be sourced from a mirror replacement system, an object detection system, a backup camera, or any other similar system or combination of systems. In some examples, the entire operational domain of the vehicle is determined using the image based analysis of the ODM 40. In alternative examples, operational factors provided to the controller 30 from an on board diagnostics system, such as vehicle speed can be utilized to supplement or verify the operational domain detected from the image analysis. The image analysis can be performed in some examples using neural networks trained to detect one or more operational factor based on the received image alone or with the assistance of context provided by existing sensors. In alternative examples, rule based analysis can be used to determine one or more operational factors in addition to those detected by the neural network analysis.

With continued reference to both FIGS. 1 and 2, the operational domain monitor (ODM) 40 is connected to, and receives images from, one or more of the cameras 17 and stores the images in a frame buffer. The frame buffer is a piece of memory that stores a full frame from the video feed of the camera 17. This frame is then provided to an algorithm within the ODM 40 that performs an object detection analysis on the frame in order to determine the operational domain that the camera (and thus the vehicle 10 carrying the camera) is currently operating in. In some examples, only a portion of a given frame is required or analyzed. In such examples, rather than analyzing a full frame buffer, the ODM 40 analyzes a partial frame. The partial frame can be, in some examples, a square area within the full frame, or a line within the full frame.

Figure 3:
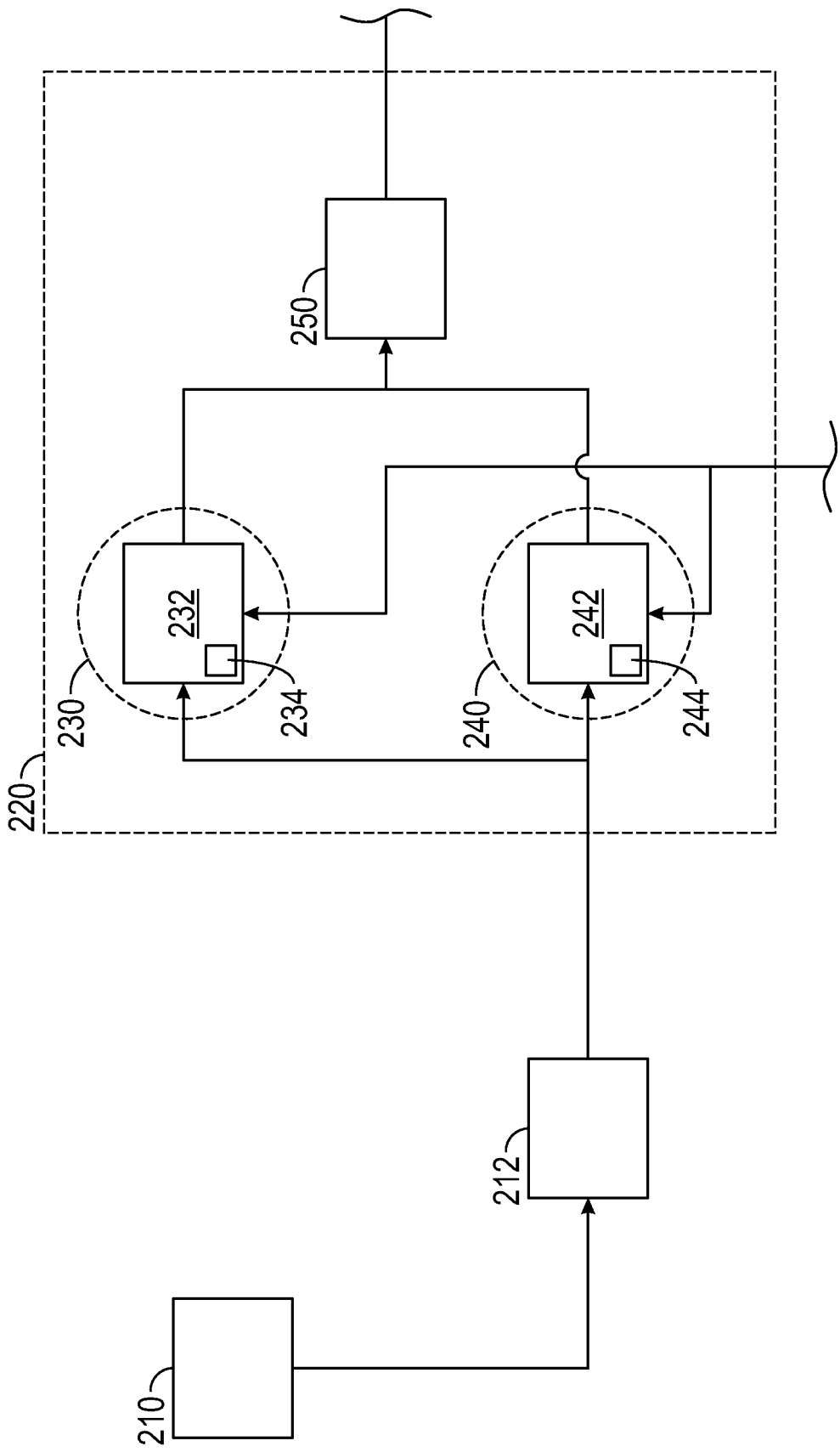
FIG. 3 schematically illustrates an ODD monitor for utilization in or with the controller of FIG. 2.

One exemplary system for implementing the operational domain monitor 40 is schematically illustrated in FIG. 3 as ODM 220. In the example of FIG. 3, a preprocessing module 210 receives image data from one or more of the cameras 17 and preprocesses the images for provision to a frame buffer 212. The preprocessing can include formatting, applying filters, removing unnecessary portions of the image, stitching multiple images together or any other similar preprocessing or processing technique. The preprocessed image is provided to a frame buffer 272 that saves the image data in a frame or partial frame. Each saved frame or partial frame is provided to the ODM 220, where the frame is provided to multiple distinct channels 230, 240. While illustrated as having two channels in the exemplary embodiment, it is appreciated that any number of channels can be included depending on the needs of a given system.

Each channel includes an analysis module 232, 242 configured to determine one or more operational factor of the vehicle 10 from the image frame using a corresponding neural network 234, 244. Each neural network 234, 244 is trained via existing data sets to determine at least one operational condition of the vehicle based on the received frame or partial frame from the frame buffer 212 via any conventional neural network training system. In some other examples, the images can be analyzed using rules based metrics such as image entropy or variability to detect occluded lenses and/or histogram levels to measure light conditions. In yet further examples multiple metrics can be utilized in conjunction with each other and/or used via a neural network to make further operating domain determinations.

The determined operational factor of a given channel 230, 240 is output from the channel 230, 240 to a compilation module 250 that combines the determined operational factors into a single operational domain that is then output to the comparison module 42 (illustrated in FIG. 2).

In some examples, one or more of the channels 230, 240 also receives supplemental sensor data from existing vehicle sensors. By way of example, the existing vehicle sensors can include speed sensors, onboard geographic positioning (such as GPS), inertial data such as acceleration, angular rate, changing in inclination, and the like. The sensor data is provided to the corresponding analysis module 232, 242 and is used by the analysis module 232, 242 to verify a determination made based on the image analysis. By way of example, if a speed range channel determines via object detection in the image that the vehicle is traveling within the range of 60-70 miles per hour, a received geographic positioning sensor signal can be utilized to verify the accuracy of the image analysis by verifying that the vehicle has traveled an appropriate distance within a set time frame. If the vehicle has not, the analysis module 232, 242 can determine that the speed range determined from the image is incorrect and rerun the analysis. In alternative examples, the sensor data can be utilized alongside the image data to determine the operational domain.

In some examples, the channels 230, 240 can include an occlusion detection channel configured to detect a weather, an amount of visibility, and other environmental conditions operational domain, a speed detection channel configured to detect a speed range of the vehicle based at least in part on object detection within the frame buffer, or any similar channels.

By utilizing existing cameras to generate image data, and determining the operational domain of the vehicle using the image data, an operational domain verification system can be incorporated into a driver assistance function without requiring the inclusion of additional expensive and/or complex sensor systems for detecting vehicle conditions.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle controller comprising:
a driver assistance module configured to perform at least one of an automated and a semi-automated driver assistance function, the at least one of the automated and the semi-automated driver assistance function including a rated operational domain;
an image based operational domain detector including at least one channel configured to receive an image from a frame buffer and determine at least part of an operational domain of at least one camera originating the image based at least in part on the image; and
a comparison module configured to compare an operational domain detected by the image based operational domain detector and the rated operation domain;
wherein the vehicle controller is configured to:
enable the at least one of an automated and a semi-automated driver assistance function based on the determined operational design domain being a match with the rated operational design domain; and
disable the at least one of an automated and a semi-automated driver assistance function based on the determined operational design domain being a mismatch with the rated operational design domain.

2. The vehicle controller of claim 1, wherein:
the at least one channel comprises a plurality of channels; and
each channel in the plurality of channels is configured to utilize the image to detect a distinct part of the operational domain of the at least one camera.

3. The vehicle controller of claim 2, wherein at least one of the channels in the plurality of channels includes a module configured to analyze the image using a neural network analysis.

4. The vehicle controller of claim 2, wherein at least one of the channels in the plurality of channels includes a module configured to analyze the image using a rules based analysis.

5. The vehicle controller of claim 2, wherein:
the at least one channel comprises a plurality of channels;
at least one of the channels in the plurality of channels includes an input configured to receive at least one sensor signal; and
the at least one sensor signal includes at least one of a geographic positioning system signal, a speed signal, an acceleration signal, and an inertial data signal.

6. The vehicle controller of claim 2, further comprising a compilation module configured to compile an output of each channel in the plurality of channels into a single operational domain output.

7. The vehicle controller of claim 1, wherein the at least one channel includes at least one of an occlusion detection channel, a weather detection channel, and a speed detection channel.

8. A method for operating a vehicle driver assist system comprising:
receiving at least one image from at least one vehicle camera;
determining an operational domain of a vehicle by analyzing the at least one image;
comparing the determined operational domain with a rated operational domain of a currently operating function of the vehicle driver assist system; and
preventing the currently operating function of the vehicle driver assist system from operating in response to the determined operational domain not matching the rated operational domain.

9. The method of claim 8, wherein determining the operational domain of the vehicle includes analyzing the at least one image using at least one neural network.

10. The method of claim 8, wherein determining the operational domain of the vehicle includes analyzing the at least one image using at least one rules based analysis.

11. The method of claim 8, wherein determining the operational domain of the vehicle by analyzing the at least one image further comprises verifying at least one component of the determine operational domain using at least one vehicle sensor.

12. The method of claim 11, wherein the at least one vehicle sensor includes at least one of a geographic positioning system signal, a speed signal, an acceleration signal, and an inertial data signal.

13. A vehicle controller comprising:
a driver assistance module configured to perform a driver assistance function that is automated or semi-automated, the driver assistance function being rated for a particular operational design domain, which is a rated operational design domain; and
an operational design domain detector configured to:
receive an image from a vehicle camera, analyze the image, and determine an operational design domain of the vehicle camera based on the analysis of the image; and
control the driver assistance function based on whether the rated operational design domain matches the determined operational design domain;
wherein to control the driver assistance function based on whether the rated operational design domain matches the determined operational design domain, the vehicle controller is configured to:
enable the driver assistance function based on the determined operational design domain being a match with the rated operational design domain; and
disable the driver assistance function based on the determined operational design domain being a mismatch with the rated operational design domain.

14. The vehicle controller of claim 13, wherein to perform the analysis, the vehicle controller is configured to detect weather conditions of an environment of the vehicle camera based on the image.

15. The vehicle controller of claim 13, wherein to perform the analysis, the vehicle controller is configured to detect a speed or speed range at which the vehicle camera is traveling based on the image.

16. The vehicle controller of claim 13, wherein to perform the analysis, the vehicle controller is configured to detect a degree of visibility in an environment of the vehicle camera based on the image.

17. The vehicle controller of claim 13, wherein the vehicle controller is configured to further base the determination of the operational design domain of the vehicle camera on supplemental sensor data from a vehicle sensor.

18. The vehicle controller of claim 13, wherein the supplemental sensor data comprises at least one of a speed signal, an acceleration signal, an inertial data signal, and a geographic positioning signal.

19. The vehicle controller of claim 13, wherein the vehicle controller is configured to utilize a neural network to perform the analysis of the image.

* * * * *

UNITED STATES PATENT AND TRADEMARK OFFICE
CERTIFICATE OF CORRECTION

PATENT NO. : 12,036,994 B2
APPLICATION NO. : 17/365262
DATED : July 16, 2024
INVENTOR(S) : Leung et al.

It is certified that error appears in the above-identified patent and that said Letters Patent is hereby corrected as shown below:

In the Claims

Claim 18, Column 8, Line 41, change "Claim 13" to --Claim 17--

Signed and Sealed this
Twentieth Day of August, 2024

Katherine Kelly Vidal
*Director of the United States Patent and Trademark Office*